United States Patent
Christiano et al.

(10) Patent No.: US 6,656,975 B1
(45) Date of Patent: Dec. 2, 2003

(54) SILICONE DISPERSIONS

(75) Inventors: Steven Patrick Christiano, Midland, MI (US); Kenneth Christopher Fey, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 10/152,514

(22) Filed: May 21, 2002

(51) Int. Cl.$^7$ .............................................. B01D 19/04
(52) U.S. Cl. ...................... 516/22; 516/117; 516/120; 435/812; 426/329; 162/164.4; 510/347; 510/349
(58) Field of Search ......................... 516/22, 117, 120; 435/812; 426/329; 162/164.4; 510/347, 349

(56) References Cited

U.S. PATENT DOCUMENTS

| | | | | |
|---|---|---|---|---|
| 4,395,352 A | * | 7/1983 | Kulkarni et al. | 516/117 |
| 4,411,933 A | | 10/1983 | Samejima et al. | 264/4.1 |
| 4,824,593 A | * | 4/1989 | Appel et al. | 510/315 |
| 4,894,177 A | | 1/1990 | Starch | 516/117 |
| 4,983,316 A | * | 1/1991 | Starch | 516/117 |
| 5,238,596 A | * | 8/1993 | Smith | 516/120 |
| 5,318,718 A | | 6/1994 | Seiter et al. | 516/117 |
| 5,773,407 A | | 6/1998 | Lai et al. | 510/466 |
| 6,136,917 A | * | 10/2000 | Christiano et al. | 516/23 |
| 6,448,298 B1 | * | 9/2002 | Romualdo et al. | 516/117 |

FOREIGN PATENT DOCUMENTS

| | | |
|---|---|---|
| EP | 0094250 B2 | 7/1986 |
| EP | 0206522 A2 | 12/1986 |
| EP | 0210731 A2 | 2/1987 |
| EP | 0 745 648 A2 * | 12/1996 |
| JP | 55100309 | 7/1980 |

\* cited by examiner

Primary Examiner—Daniel S. Metzmaier
(74) Attorney, Agent, or Firm—Clark Hill PLC

(57) ABSTRACT

A silicone composition having a continuous phase of a polar organic liquid including particles of a silicone active material encapsulated within an organic encapsulating material which is a solid at 25° C. The silicone active material is sparingly soluble in the polar organic liquid at 25° C., but is substantially dissolved in the polar organic liquid at temperatures of from 40 to 100° C. The three phase contact angle between the organic encapsulating material, the silicone antifoam, and the polar organic liquid is below 130° C., with the angle measured through the silicone.

22 Claims, 1 Drawing Sheet

SILICONE DISPERSIONS

FIELD OF THE INVENTION

This invention relates to a liquid dispersion or emulsion formulation containing an active silicone material. By an active silicone material we mean a silicone conferring a desired benefit to a medium in which it is incorporated. In particular the invention relates to a liquid dispersion or emulsion formulation which can be dispersed in a secondary liquid medium and in which the benefits of the active silicone material are increased by slowing the rate of dispersion or release of the silicone into the secondary medium.

The active silicone material can for example be a silicone antifoam. Slow release of that antifoam in the foaming medium can provide greatly increased performance and high persistency.

BACKGROUND TO THE INVENTION

An antifoam or foam control agent is a material which, when added in low concentration to a foaming liquid controls problems of excess or undesired foam. The antifoam equilibrates the rate of foam collapse with the rate of foam formation and can remove unsightly and troublesome surface foam, and improve filtration, watering, washing and drainage of various types of suspension, mixtures, and slurries. Antifoams are used for example in the pulp and paper industry, paints and latex coating processes, fertilizers, textile cleaning, dying and treating, fermentation processes, metal working, adhesives, caulk and polymer manufacture, food processing such as sugar extraction from sugar beet, oil extraction, cooling towers, and in municipal and industrial water treatment as well as in liquid or solid detergent compositions.

In many of the above uses an aqueous stream can move through a process or plant providing many opportunities and locations for foam to form, for example when pumping or washing and in sluice ways. Pumping foam control agents into the stream at each position of foam generation can be problematic and expensive.

Encapsulated and slow release antifoams are described in the literature. For example there are a variety of granulated materials described which are claimed to have delayed release properties. U.S. Pat. No. 4,894,177 describes a delayed release granulated antifoam for laundry detergents where the antifoam is contained on a water soluble cellulose material. EP-A-924250 describes a granulated antifoam contained on starch including a waxy coating that delays release. EP-A-206522 describes an antifoam granule that is coated with silicone oil or wax which disrupts in water. EP-A-210731 describes a finely divided antifoam containing silicone and hydrophobic silica with a high melting point organic such as a monoester of glycerol and fatty acid and describes the process for granulation of the combination on a fluidized bed. U.S. Pat. No. 5,318,718 teaches a process for forming granular antifoam powder on phosphate free cellulosic carriers with a wax and silicone components.

U.S. Pat. No. 5,773,407 describes the formation of a cross linked coating on the exterior of emulsified silicone antifoam droplets by reaction with reactive silanes. Slow release benefits in laundry applications are claimed. JP-A-55-100309 describes the use of a protein encapsulated silicone antifoam that is released during tooth brushing.

In U.S. Pat. No. 4,411,933 ethyl cellulose is coated on the outside of alkylpolysiloxane droplets from a cyclohexane dispersion.

SUMMARY OF THE INVENTION

A silicone composition according to the present invention comprises a continuous phase of a polar organic liquid having dispersed therein particles of a silicone active material encapsulated within an organic encapsulating material which is solid at 25° C., is sparingly soluble in the polar organic liquid at 25° C. but is substantially dissolved in the polar organic liquid at an elevated temperature in the range 40–100° C., wherein the three phase contact angle between the organic encapsulating material, the silicone antifoam, and the polar organic liquid, with the angle measured through the silicone, is below 130°.

The invention includes a foam control composition comprising a continuous phase of a polar organic liquid having dispersed therein a polyorganosiloxane fluid combined with a surfactant of HLB below 8 and a hydrophobic silicaceous material.

A preferred process according to the invention for the production of an encapsulated silicone composition comprising (i) dispersing a silicone active material, a solid organic encapsulating material and a hydrophobic silicaceous material in a polar organic liquid with shear so that the average silicone particle size is less than 0.5 mm, the temperature of the dispersion being sufficiently high that the said organic encapsulating material is dissolved in the composition; and (ii) cooling the dispersion to deposit the organic encapsulating material onto the interface of the silicone particles while agitating sufficiently to maintain the silicone particle size below 0.5 mm.

The encapsulation of the silicone in the form of droplets within a matrix or shell of the solid organic encapsulating material that is moderately soluble in the secondary liquid medium enables the benefits of that silicone to be increased by slowing the rate of dispersion or release of the silicone into a secondary liquid medium which has a foam problem.

DETAILED DESCRIPTION OF THE INVENTION

Figure 1:
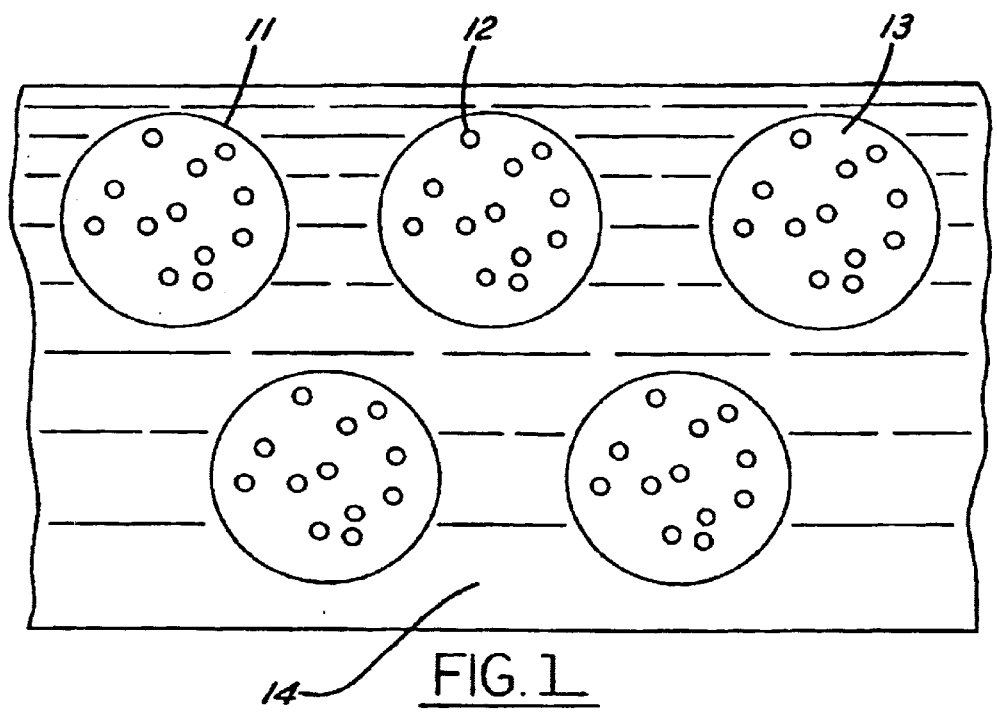
FIG. 1 is a diagrammatic cross-section of a silicone dispersion according to the invention.

The preferred silicone active material is an antifoam. The silicone antifoam generally comprises a polyorganosiloxane fluid and a hydrophobic filler.

The polyorganosiloxane fluid may be a linear polyorganosiloxane or a branched or cross-linked polyorganosiloxane, and preferably has a low and controlled level of silanol below 0.1% by weight, preferably from 0.01–0.05% by weight. Linear polyorganosiloxane fluids can be expressed by the general formula $R^1_a SiO_{(4-a)/2}$ in which the groups $R^1$ are the same or different monovalent hydrocarbon or halogenated hydrocarbon groups having one to ten carbon atoms and a has a value of 1.9 to 2.2. Specific examples of groups $R^1$ include methyl, ethyl, propyl, butyl, octyl, trifluoropropyl, phenyl, 2-phenylethyl, 2-phenylpropyl and vinyl groups. The polyorganosiloxane fluid preferably has a viscosity of 20 to 100,000 mm²/sec (mPa-sec) at 25° C. It is particularly preferred that the polyorganosiloxane is a trimethylsilyl-terminated polydimethylsiloxane (PDMS) having a viscosity of about 350 to 15,000 mm²/sec at 25° C.

Alternatively, a substituted, branched or cross-linked polyorganosiloxane may be used. The branching may be in the siloxane chain, brought about e.g. by the presence of some tri-functional siloxane units of the formula $ZSiO_{3/2}$, where Z denotes a hydrocarbon, hydroxyl or hydrocarbonoxy group. Alternatively branching may be caused by a multivalent, e.g. divalent or trivalent, organic or siliconorganic moiety linking siloxane polymer chains. This can be introduced by a platinum catalyzed reaction between a polyorganosiloxane containing Si—H groups and an unsaturated organic compound or polyorganosiloxane. Organic divalent linking groups can be derived for example from 1,5-hexadiene or divinylbenzene. Silicon-organic linking units can for example be introduced by reaction of divinyltetramethyldisiloxane or other polyorganosiloxanes containing unsaturated hydrocarbon. The polyorganosiloxane may be substituted alkyl groups having 9 to 35 carbon atoms as described in EP-A-578424. The organopolysiloxane can alternatively be substituted by an aralkyl group, for example a 2-phenylethyl or 2-phenylpropyl groups formed by reaction of styrene or alpha-methylstyrene with a Si—H group as described in EP-A-1075864. Further examples of suitable polyorganosiloxane fluids are described in U.S. Pat. No. 4,741,861, where a Si—H functional diorganopolysiloxane is reacted with a silanol-containing silane, in EP-A-516109, where a Si—H functional polyorganosiloxane is reacted with a vinyldimethyl-terminated polydimethylsiloxane and a trimethylsiloxy silicate.

The hydrophobic filler is preferably silica particles with a surface area of at least 50 $m^2/g$ as measured by BET, for example fumed silica, precipitated silica and gel formation silica. Fumed TiO2, Al2O3, zinc oxide or magnesium oxide are alternative fillers. The average particle size of the filler is preferably from 0.1 to 20 micrometers, most preferably 0.5 to 5 micrometers. The surface of the filler is rendered hydrophobic by treatment with treating agents such as reactive silanes or siloxanes, for example, dimethyldichlorosilane, trimethylchlorosilane, hexamethyldisilazane, hydroxyl end-blocked or methyl end-blocked polydimethylsiloxanes, siloxane resins, fatty acids or a mixture of one or more of these. Fillers which have already been treated with such compounds are commercially available. The surface of the filler may be rendered hydrophobic before or after the addition of the filler to the organopolysiloxane fluid.

The silicone antifoam optionally contains a siloxane resin, for example a resin consisting of monovalent trihydrocarbonsiloxy (M) groups of the formula $R3SiO1/2$ and tetrafunctional (Q) groups $SiO4/2$ wherein R denotes a monovalent hydrocarbon group, preferably methyl. The molar ratio of $(CH_3)_3SiO_{1/2}$ to $SiO_2$ units is preferably from 0.4:1 to 1.2:1. The siloxane resin is preferably a solid resin and can be present as an insoluble filler or may be wholly or partially soluble in the liquid organopolysiloxane.

The polar organic liquid continuous phase preferably comprises a polyether. It can for example be selected from the group consisting of polyethylene glycol, polypropylene glycol, polyoxyethylene (EO) polyoxypropylene (PO) copolymers of either a random or a block type and condensates of any of these with polyols such as glycerol or sorbitol or pentaerythritol or other polyols. Preferred polyethers have molecular weights of from 100 to 10,000. Preferred polyethers are EO/PO copolymers containing about 50 wt. % or greater PO, particularly EO/PO/EO block copolymers such as those available from BASF Corporation under the Trade Mark Pluronic or from Dow Chemical Corporation under the Trade Mark Voranol.

Alternatively the polar organic liquid can comprise a vegetable oil such as sunflower oil, soybean oil or corn oil. The oil preferably has a melting point below 20° C. and purity of at least a technical grade.

The polar organic liquid continuous phase can comprise a blend of a polyether with a vegetable oil, provided that these are miscible with each other. Polyethers which are high in PO content are miscible with oil within relatively wide miscibility limits. One means to extend miscibility limits is to use a compatibilizing agent to aid dissolution of one polar organic liquid into the other. One example of this approach is the use of a propoxylated glycerol ether as a compatibilizing agent that helps solubilize soybean oil into an EO/PO/EO block copolymer such as Pluronic L121. Propoxylated glycerol ethers are available from Dow Chemical Corporation under the Trade Mark Voranol, for example Voranol 4701.

The polar organic liquid continuous phase can include low molecular weight polyglycols, glycols such as propylene glycol or ethylene glycol, or alcohols. These lower molecular weight polar organic liquids act as diluents or viscosity modifiers and may be used for example at up to 60% by volume, preferably up to 40%, for example at 1–20%. Less polar organic liquids such as petroleum distillates can also be used as diluents/viscosity modifiers if they are miscible with or soluble in the continuous phase.

The organic encapsulant is a solid material which is sparingly soluble in the polar organic liquid at 25° C. but preferably is substantially dissolved in the polar organic liquid at an elevated temperature in the range 40–100° C. The organic encapsulating material generally has a solubility at 25° C. of below 50 g/L and preferably below 10 g/L in the polar organic liquid, and preferably has a melting point of 40–100° C. Most preferably the solid organic encapsulating material is crystalline. For the desired slow release of the silicone active material, the solid organic encapsulating material is preferably only moderately or sparingly soluble or slowly dissolving in the medium in which the encapsulated silicone composition is to be used. For example, because the vast majority of foam control needs are for aqueous foaming solutions, the solid organic encapsulating material in a foam control composition according to the invention preferably has a slow rate of solubilisation in aqueous solutions, for example less than 10 mg/L of aqueous medium in 10 minutes at 25° C.

The organic encapsulating material should generally be at least moderately wettable by the silicone active material within the polar organic liquid continuous phase. Wettability is judged using a measurement of a three phase contact angle between the organic encapsulating material, the silicone antifoam, and the continuous phase, with the angle measured through the silicone at 25° C. after 10 minutes of equilibration. Moderate wettability is defined as having a three phase contact angle less than 130°, preferably between 110° and 45°. The solid organic material used as organic encapsulating material can be prepared for testing contact angle by providing a smooth surface formed against a hydrophobic solid, for example by allowing the molten organic material to solidify against a smooth polytetrafluoroethylene piece within a cylindrical mold. The mold containing the solidified organic encapsulating material is immersed in the polar organic liquid held within a cuvette. At room temperature, small drops of silicone fluid or silicone active material are placed onto the surface of the solid and allowed to equilibrate for 10 minutes. The contact angle of the drop is measured using a goniometer.

One preferred organic encapsulating material comprises a surfactant of HLB (hydrophilic lipophilic balance) below 8.

The surfactant of HLB below 8 can be an anionic, cationic, zwitterionic or nonionic surfactant. The surfactant can for example be a fatty acid such as palmitic acid, stearic acid, arachidic acid or behenic acid, or mixtures thereof, or myristic acid or lignoceric acid, or a fatty acid ester, preferably an ester of a saturated fatty acid such as palmitic acid, stearic acid, arachidic acid or behenic acid, or mixtures thereof, with an alcohol or polyol. Polyol esters are preferred, for example those formed with sorbitol, glycerol, or a glycol such as ethylene glycol or propylene glycol or polyethylene oxide or polypropylene oxide or copolymers thereof. The polyols can be monoesterified or esterified on multiple sites. Fatty acids or fatty acid esters that form needle shaped crystals are preferred. The surfactant preferably has a HLB of below 7, most preferably below 5.

Such a surfactant can be used alone as the organic encapsulating material, or the solid organic encapsulating material can for example be a blend of 50 to 100% by weight of a crystalline surfactant of HLB below 8 with 0 to 50%, for example 1 to 50% of an alkylmethyl polysiloxane wax or an oil or fat which is not miscible with the polar organic liquid.

The alkylmethyl polysiloxane wax is generally of the formula $R_a R^2_b SiO_{(4-a-b)/2}$ where $R^1$ is methyl, and $R^2$ is a larger alkyl moiety such as ethyl, propyl, butyl, pentyl, hexyl, octyl, decyl, dodecyl, tetradecyl, and preferably an alkyl group of at least 16 C atoms such as hexadecyl or octadecyl, more preferably 20 to 100 C atoms such as $C_{24}H_{49}$ or $C_{30}H_{61}$, and a+b has a value of 1.0 to 2.2. It is preferred that the alkylmethyl polysiloxane wax is a trimethylsilyl-terminated linear polydiorganosiloxane of melting point higher than about 40° C. comprising alkylmethylsiloxane units, optionally together with dimethylsiloxane units.

The oil or fat used as an optional part of the encapsulating composition can for example be a vegetable oil such as sunflower oil, safflower oil or soybean oil or an animal derived oil such as lard oil or neat's foot oil. The oil or fat should not be miscible with the polar organic liquid.

The hydrophobic silicaceous material acts as an aid to encapsulation. One preferred type of hydrophobic silicaceous material is a branched silicone resin containing monovalent tri-hydrocarbonsiloxy (M) groups of the formula R3SiO1/2 and tetrafinctional (Q) groups SiO4/2 or trivalent hydrocarbonsilsesquioxy (T) RSiO3/2 groups, wherein R denotes a monovalent hydrocarbon group, preferably methyl. A preferred silicone resin is a methyl MQ resin in which the molar ratio of $(CH_3)_3SiO1/2$ to $SiO_2$ units is preferably from 0.4:1 to 1.2:1. The silicone resin is preferably a solid resin and can be present as an insoluble filler or may be wholly or partially soluble in the silicone active material. The amount of branched silicone resin used is preferably at least 5% by weight based on silicone active material, more preferably at least 10% up to 50%. This is a higher level of silicone resin than has previously been suggested for inclusion in foam control compositions. We have found that the proportion of active silicone material which is encapsulated drops as the level of branched silicone resin is reduced below 10%.

A second preferred type of hydrophobic silicaceous material useful for this invention is a fumed or precipitated silica with high surface area, preferably greater than 100 m2/g BET surface area, and more preferably greater than 200 m2/g, that is rendered hydrophobic by treatment with treating agents such as reactive silanes or siloxanes, for example, dimethyldichlorosilane, trimethylchlorosilane, hexamethyldisilazane, hydroxyl end-blocked or methyl end-blocked polydimethylsiloxanes, siloxane resins, fatty acids or a mixture of one or more of these. Such a hydrophobic silica is preferably used at 3–20% by weight based on the organic encapsulating material.

In the process of the invention, the various steps comprising part (i) of the process, that is, dispersing a silicone active material, a solid organic encapsulating material and a hydrophobic silicaceous material in a polar organic liquid with shear so that the average silicone particle size is less than 0.5 mm, the temperature of the dispersion being sufficiently high that the said organic encapsulating material is dispersed in the composition as a liquid, can be carried out in any order before, in part (ii) of the process, cooling the dispersion to deposit the organic encapsulating material onto the interface of the silicone particles while agitating sufficiently to maintain the silicone particle size below 0.5 mm.

In one preferred procedure for carrying out part (i), the silicone active material is mixed with the polar organic liquid and the organic encapsulating material (used as encapsulant) and the mixture is heated while shearing the mixture so that the average silicone particle size is less than 0.5 mm. In this procedure, the silicone active material (or the various ingredients which together form the silicone active material), the polar organic liquid and the organic encapsulating material can be mixed in any order. The ingredients are usually combined in a main vessel using mechanical mixing. Premixes can be formed. We have found that when the hydrophobic silicaceous material is a branched silicone resin, it most effectively aids encapsulation when it is premixed with the silicone active material. Contrarily, when the hydrophobic silicaceous material is a silica with surface area greater than 100 m2/g that is rendered hydrophobic, it most effectively aids encapsulation when it is premixed with the organic encapsulating material (used as encapsulant). Other premixes can be formed; for example when forming a foam control composition premixes containing all or a portion of the polyorganosiloxane fluid, the hydrophobic filler, and/or the organic encapsulating material or a component thereof such as an oil or alkylmethylsiloxane wax can be made prior to addition to the main vessel.

After mixing, the system is agitated and heated to or above the dissolution temperature of the solid organic encapsulating material. The dissolution temperature is the temperature at which the solid organic encapsulating material melts or dissolves in the polar organic liquid substantially eliminating any solid form of the substance. The mixture is agitated with sufficient shear to produce an average silicone particle size less than about 500 $\mu$m and preferably less than 200 $\mu$m, most preferably between about 5 $\mu$m and 100 $\mu$m.

In an alternative procedure for carrying out part (i), the said organic encapsulating material is dispersed in the silicone active material at a temperature at least 5° C. above the melting point of the organic encapsulating material with agitation so as to produce particles of the organic encapsulating material of particle size finer than 0.5 mm and the resulting dispersion is mixed with the polar organic liquid at a temperature at least 5° C. above the melting point of the organic encapsulating material so that the organic encapsulating material substantially dissolves into the composition, while shearing the mixture so that the average silicone particle size is less than 0.5 mm, most preferably between about 5 $\mu$m and 100 $\mu$m.

The process of forming dispersed particles of the organic encapsulating material provides particles that are able to adhere to the surface of the silicone droplets. The adhesion process occurs optimally if the size of the particles is correct relative to the size of the droplets. Therefore, on average the longest axis of the disperse organic encapsulating material particle or other encapsulant particle should preferably be no greater than 10 times the average diameter of the silicone antifoam droplet, more preferably equal to or less than 2 times the droplet diameter, and most preferably equal to or less than the average droplet diameter. The organic encapsulating material particle size is preferably less than 0.5 mm, most preferably less than 0.1 mm, for example between about 5µm and 100 µm.

The process of adsorption of the organic encapsulating material onto the surface of the silicone droplets is dependent on the wetting characteristics of the organic encapsulating material (encapsulant solids) and requires mixing to promote physical contact between the dispersed organic encapsulating material (encapsulant solids) and the silicone droplets. The formation of crystals of the solid organic encapsulating material near or at the surface of the droplet is highly advantageous to the formation of an encapsulating shell. The formation of crystals of the solid organic encapsulating material near or at the surface of the droplet can be observed particularly when a hydrophobic silicaceous material is present (the hydrophobic silicaceous material promotes interfacial crystallisation of the encapsulant).

Whichever procedure has been used for part (i) of the process, the dispersion is then cooled either passively or actively to provide for solid deposition of the organic encapsulating material while agitating the dispersion sufficiently to maintain the silicone particle size below 0.5 mm.

Other ingredients such as diluents or viscosity modifiers can optionally be added after the process mixture has cooled and deposition and/or crystallization of the solid organic encapsulating material is partially or substantially complete.

The silicone dispersion produced generally comprises encapsulated particles of silicone active material, e.g. encapsulated antifoam particles in a continuous phase of polar organic liquid. The dispersion preferably contains between 1 wt. % and 99 wt. %, more preferably between 5 wt. % and 60 wt. %, and most preferably between 10 and 40 wt. % of the encapsulated particles. Preferably, the compositions are flowable.

Figure 2:
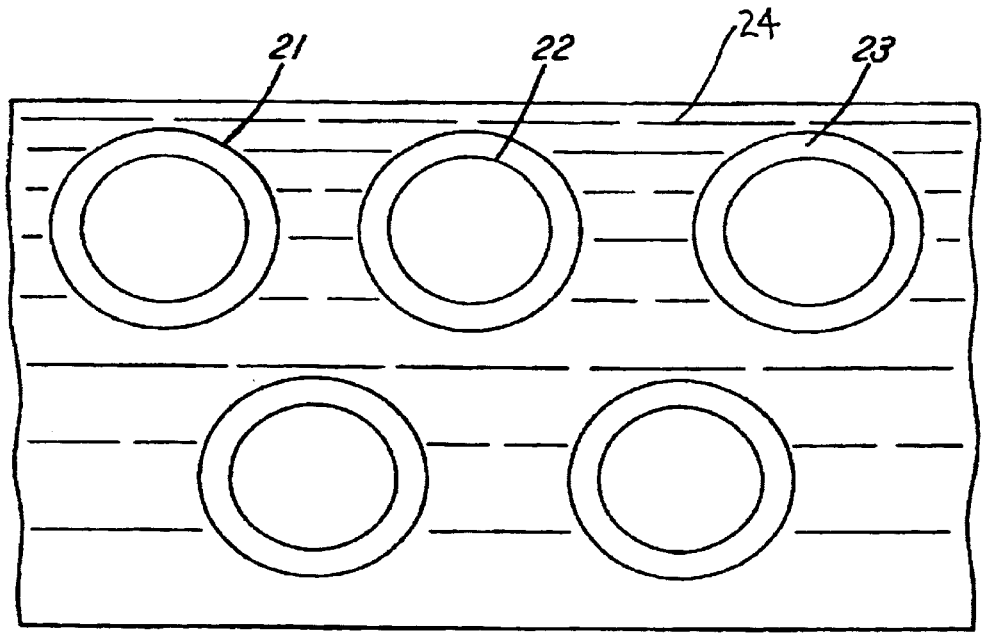
FIG. 2 is a diagrammatic cross-section of an alternative silicone dispersion according to the invention.

Each encapsulated antifoam particle comprises a silicone antifoam composition in intimate contact with and surrounded by an organic encapsulating material, so as to substantially enclose or envelop the silicone, avoiding or limiting the contact between the silicone and the foaming medium when the encapsulated antifoam is initially dosed into the foaming medium. Distribution of silicone antifoam within the organic encapsulating material can be of the type referred to as matrix type encapsulation or the core-shell encapsulation type, as shown in the accompanying diagrammatic drawings. FIG. 1 shows matrix type encapsulation, in which particles (11) each comprising droplets of the active silicone antifoam (12) distributed through the organic encapsulating material (13) are dispersed in polar organic liquid (14). FIG. 2 shows core-shell type encapsulation having particles (21) in which an inner region contain the active silicone material (22) and the outer periphery or the surface of the particle is composed of the organic encapsulating material (23) dispersed in polar organic liquid (24). We have found that where the organic encapsulating material is moderately wettable by the silicone active material within the polar organic liquid continuous phase (three phase contact angle between 130° and 45°, preferably between 110° and 45°), core shell encapsulation is likely to occur. Where the organic encapsulating material is highly wettable (three phase contact angle below 45°), matrix encapsulation is more likely.

Physical changes in the organic encapsulating material will allow the release of the silicone antifoam into the foaming medium. Those physical changes include any action that causes a rupture in the encapsulant, such as dissolution, melting or shear degradation of the organic encapsulating material. If that physical change occurs at a limited rate, then a slow release of the silicone is achieved with beneficial effects on antifoam longevity of performance. For example, dissolution is limited where that organic encapsulating material is only moderately soluble in the foaming medium and shear degradation is limited where only a limited amount of the solution is exposed to shear at a given time.

The encapsulated particles preferably comprise 20–95% by weight silicone active material and 5–80% organic encapsulating material. More preferably the particles comprise 30–90% silicone active material with 10–70% organic encapsulating material of which 5–60% (based on the weight of the particles) is a crystalline surfactant of HLB below 8, 2–30% is a hydrophobic silicaceous material and 0–35% is an auxiliary encapsulant such as an alkylmethyl polysiloxane wax. For example, the encapsulated antifoam particles in a preferred foam control composition may comprise 35–85% by weight polysiloxane fluid, 2–10% hydrophobic silica, 0–10% silicone resin, 10–50% crystalline surfactant of HLB below 8 and 0–15% auxiliary encapsulant.

Foam control compositions according to the invention can be used for example in the pulp and paper industry, paints and latex coating processes, fertilizers, textile cleaning, dying and treating, fermentation processes, metal working, adhesives, caulk and polymer manufacture, food processing such as sugar extraction from sugar beet, oil extraction, cooling towers, and in municipal and industrial water treatment, or in detergents, particularly liquid detergent compositions. They are particularly effective in proteinaceous foaming media such as those associated with food processing, fermentation or waste water treatment. The liquid form of the composition offers ease of delivery of the antifoam through pumping and the ability to custom blend the slow release antifoam material with other foam controlling agents. Release of the antifoam from the encapsulated system can be accomplished by slow dissolution of that system or by melting as temperature in the foaming medium increases, or by a combination thereof.

The invention is illustrated by the following Examples, in which parts and percentages are by weight.

EXAMPLES 1 to 7

The following surfactants and polar organic liquids were used:

Aldo® MS is a stearic acid glycerol ester consisting mainly of mono and diglycerides available from Lonza Incorporated.

PGMS is propyleneglycol monostearate, a food grade surfactant available from Pfaltz and Bauer Corporation.

Span® 60 is a sorbitan monostearate surfactant available from Uniqema Corporation.

Pegosperse® 50 DS is a polyethylene glycol 400 distearate surfactant available from Lonza Corporation.

Stearic acid is a fatty acid available from Aldrich Corporation.

Aldo® MSLG is a low glycerine form of glycerol monostearate available from Lonza Corporation.

Pluronic® L 121 is a block copolyether having an average molecular weight of 4400 g/mole available from BASF Corporation.

Pluronic® L 61 is a block copolyether having an average molecular weight of 2000 g/mole available from BASF Corporation.

Antifoam Premix A was made by blending 95 parts of a 1000 cSt (1 Pa.s) trimethyl terminated polydimethylsiloxane (PDMS) fluid and 5 parts of Sipemat (Trade Mark) D11 silicone-treated silica. A marine mixing blade was set at 300 rpm and mixing was conducted for 30 minutes.

Premixes 1 through 6 were then prepared by mixing 91% Aldo® MS and 9% of each of the silica fillers listed in Table 1. The surfactant was melted at 85C, then the silica was added and mixing carried out using a marine blade at 300 rpm for 30 minutes.

TABLE 1

| Premix Silica Number | Type of Structure |
|---|---|
| 1 | Sipernat D11 Food Grade, polydimethylsiloxane treated. |
| 2 | Aerosil US 202 Fumed, polydimethylsiloxane treated |
| 3 | Aerosil US 204 Fumed, polydimethylsiloxane treated |
| 4 | Aerosil R 106 High surface area fumed, cyclic silicone treated. |
| 5 | Aerosil R 812 High surface area fumed, hexamethyldisilazane treated. |
| 6 | Cabot TS 720 Fumed, moderately treated with polydimethylsiloxane |

The foam control compositions of Examples 1 to 6 were then prepared by mixing 4.4 parts of Premix A with 17.5 parts of Premix 1 through 6 respectively at 65° C. for 15 minutes at 300 rpm. The temperature was then raised to 85° C. and mixing was continued for another 15 minutes. Then the rpm was increased to 450 for an additional 30 minutes of mixing. Then 78.13 parts of Pluronic® L121 liquid polyether was added with an additional 30 minutes of mixing at 450 rpm. Finally the concentrate was cooled to ambient temperature with mixing at 600 rpm for 30 minutes.

The foam control composition of Example 7 was prepared in the same manner as Example 1, except that Pluronic® L61 was substituted for L121.

Each of the foam control compositions of Examples 1 to 7 exhibit the encapsulated shell-like structure typical of this invention. All are stable, uniformly homogeneous dispersions with the exception of Example 7 which is grainier in consistency and has a tendency to settle. Performance was assessed in a sparge column using potato liquor (water containing chopped potatoes that simulates process or wash water in commercial potato slicing) and is reported in Table 2 below. To obtain the test results in Table 2, each part of antifoam concentrate was diluted with 3 parts of n-butanol. The diluent has no effect on the foaming character of potato liquor. The actives content includes all materials dosed to the sparge test except the butanol diluent. The defoaming tests were run at 25° C. Comparative tests were carried out using no antifoam and using the Pluronic polyethers alone at various concentrations.

TABLE 2

| | | Foam Height (cm) | |
|---|---|---|---|
| Antifoam Concentrate | Actives (ppm) | At 5 minutes | At 15 minutes |
| No Antifoam | — | 73.5 | >85 |
| 1 | 25 | 1 | 6 |
| 2 | 25 | 2.5 | 6.5 |
| 3 | 25 | 1 | 7.5 |
| 4 | 25 | 0.5 | 4.5 |
| 5 | 25 | 0.5 | 4.0 |
| 6 | 25 | 0.5 | 5.0 |
| 7 | 32 | 47 | >85 |
| 7 | 66 | 37 | >85 |
| 7 | 129 | 1 | 26 |
| Pluronic ® L121 (control) | 25 | 40 | >85 |
| Pluronic ® L121 (control) | 50 | 16 | 42 |
| Pluronic ® L121 (control) | 100 | 12 | 12 |
| Pluronic ® L61 (control) | 100 | 54 | >85 |
| Pluronic ® L61 (control) | 200 | 53 | 85 |

The antifoams of Examples 1 to 6 were very effective at controlling foam. For the antifoam of Example 7, which comprised the lower molecular weight Pluronic® L61, higher doses were required to control foam. Antifoams based on Pluronic L61 are much more effective at temperatures above 30° C. In Table 3 below the antifoams of Examples 1 and 7 are tested and compared to Pluronic polyethers alone under the same conditions as described in Table 2 with the exception that the test temperature was raised to 38° C.

TABLE 3

| | | Foam Height (cm) | |
|---|---|---|---|
| Antifoam | Actives (ppm) | At 5 minute | At 15 minutes |
| No Antifoam | — | 80 | >85 |
| 1 | 32 | 12.5 | 15 |
| 1 | 63 | 1.5 | 3.5 |
| 1 | 127 | 3 | 4 |
| Pluronic ® L121 (control) | 100 | 5 | 3.5 |
| 7 | 32 | 36 | >85 |
| 7 | 63 | 3.5 | 4 |
| 7 | 127 | 0.5 | 0.5 |
| Pluronic ® L61 (control) | 100 | 5.0 | 2.4 |

EXAMPLES 8 to 13

Antifoam compositions were prepared by diluting the antifoam of Example 1(3) with various amounts of Pluronic L61, and were tested in the sparge test with potato liquor as described above carried out at 33° C. The results are shown in Table 4 below. The "actives" recorded include the added Pluronic L61 as well as the Example 1(3) antifoam

TABLE 4

| | | Foam Height (cm) | |
|---|---|---|---|
| Antifoam | Actives (ppm) | At 5 minutes | At 15 minutes |
| No antifoam | 0 | 80 | >85 |
| Pluronic L61 | 100 | 4.5 | 1.5 |

TABLE 4-continued

| Antifoam | Actives (ppm) | Foam Height (cm) | |
|---|---|---|---|
| | | At 5 minutes | At 15 minutes |
| Pluronic L61 | 75 | 46 | 85 |
| Pluronic L61 | 45 | 61 | >85 |

Example 1(Antifoam Concentrate H) diluted in Pluronic® L61 at . . .

| Example | Dilution | Actives (ppm) | Foam Height (cm) | |
|---|---|---|---|---|
| | | | At 5 minutes | At 15 minutes |
| 8 | 10% | 75 | 2.5 | 2 |
| 9 | 15% | 100 | 0.5 | 1 |
| 9 | 15% | 75 | 2.5 | 2 |
| 9 | 15% | 45 | 28 | 43 |
| 10 | 20% | 75 | 1 | 2 |
| 11 | 30% | 75 | 0.5 | 1.5 |
| 11 | 30% | 45 | 25 | 32 |
| 12 | 40% | 45 | 16 | 22 |
| 13 | 50% | 45 | 14 | 20 |
| 13 | 50% | 35 | 24 | 31 |

EXAMPLES 14 to 18

The following surfactants, all of HLB below 8, were tested for their suitability as the solid organic encapsulant of the invention Example 14—PGMS Example 15—Span® 60. . .

Example 16—Pegosperse® DS 50

Example 17—Stearic Acid

Example 18—Aldo® MSLG

Each of the above surfactants was melt dispersed at 4% in Pluronic L61 by heating and agitation and was allowed to cool. In each case solid particles were precipitated and the particles had the following melting points:

Example 14—57° C.

Example 15—57° C.

Example 16—56° C.

Example 17—42° C.

Example 18—48° C.

EXAMPLES 19 and 20

The procedure of Examples 14 to 18 was followed using the following compositions:

Example 19—4% PGMS and 10% sunflower oil in Pluronic L61

Example 20—4% Span® 60 and 10% sunflower oil in Pluronic L61

In each case solid particles were precipitated and the particles had the following melting points:

Example 19—50° C.

Example 20—59° C.

50% 1000 cSt PDMS fluid was added to the melted surfactant of each of the compositions of Examples 14 to 20 before mixing with the Pluronic 61. In each case the surfactant was precipitated to at least partially encapsulate the polysiloxane fluid. The resulting compositions were tested as antifoams in the sparge test at 33° C. and showed similar foam control to the composition of Example 7.

EXAMPLES 21 to 23

10% dispersions in sunflower oil of Aldo® MS (Example 21), Pegosperse® DS 50 (Example 22), and stearic acid (Example 23) were prepared by first heating the mixtures with frequent stirring at 105° C. After 20 minutes at this temperature, the solutions were allowed to cool without agitation. In each case the surfactant precipitated to form crystals during the cooling process. When a polysiloxane fluid is mixed with the surfactant and sunflower oil, the surfactant precipitates on the polysiloxane fluid droplets during cooling.

EXAMPLE 24

16 parts of a dispersion of 15% silicone resin in PDMS was heated at 70° C. and mixed at 450 rpm for 15 minutes with 4 parts of Pegosperse 50DS. Then 14.3 parts PDMS fluid having a viscosity of 1000 cs was added and mixing and heated continued as before for another 15 minutes. 1.7 parts of a treated silica, Sipernat D11, was then added and mixed at 70° C. for 15 minutes, then 53.11 parts of Pluronic L61 under the same conditions, followed by additional mixing for 30 minutes at a higher rate of 600 RPM. 0.9 parts of a vegetable oil was added continuing the heating and mixing as before for 15 minutes. The speed was then dropped to 300 RPM and the solution cooled to 40° C. at which time 10 parts of propylene glycol was added, forming an antifoam concentrate.

EXAMPLES 25 and 26

Example 24 was repeated using Aldo® MS (Example 25) and PGMS (Example 26) as surfactant in place of the Pegosperse.

EXAMPLES 27 to 29

Each of the antifoam concentrates prepared in Examples 24 to 26 (20 parts) was mixed with 80 parts of a polar organic liquid composed of 12 parts of soybean oil, 23 parts of a glycerol alkoxylated ether (Dow Chemical PT 3000) of Mol wt=3000, and viscosity (25° C.)=450–500 cst (0.5 mPa.s), 10 parts of Pluronic L61 and 5 parts of Pluronic L62. resulting antifoam compositions were tested as antifoams for potato liquor in the sparge test at 33° C., with the polar organic liquid alone used as a comparison. The results are described in Table 5 below.

EXAMPLES 30 to 32

Each of the antifoam concentrates prepared in Examples 24 to 26 (20 parts) was also diluted with 80 parts Pluronic L61. The resulting antifoam compositions were tested as described in Examples 27 to 29. The results are also described in Table 5 below.

TABLE 5

| Example | Organic Surfactant | Actives (ppm) | Foam Height (cm) | |
|---|---|---|---|---|
| | | | At 5 minutes | At 15 minutes |
| Comparison 27 | Organic Liquid | 49 | 18 | 25 |
| | Pegosperse 50 DS | 49 | 9 | 16 |
| 28 | Aldo MS | 49 | 14 | 19 |
| 29 | PGHMS | 49 | 14 | 20 |
| Comparison | Organic Liquid | 100 | 10 | 11 |
| 27 | Pegosperse | 100 | 0.5 | 2 |

TABLE 5-continued

| Example | Organic Surfactant | Actives (ppm) | Foam Height (cm) | |
|---|---|---|---|---|
| | | | At 5 minutes | At 15 minutes |
| | 50 DS | | | |
| 28 | Aldo MS | 100 | 0.5 | 1 |
| 29 | PGHMS | 100 | 0.5 | 0.5 |
| 30 | Pegosperse 50 DS | 100 | 1 | 1 |
| 31 | Aldo MS | 100 | 1 | 1 |
| 32 | PGHMS | 100 | 1 | 2 |

EXAMPLE 33

An antifoam concentrate was made using a vegetable oil instead of a continuous polyether phase. 5.0 parts of Pegosperse 50DS and 80.0 parts of sunflower oil were mixed at 300 rpm for 30 minutes at 70° C. To this was added 15 parts of a 5% dispersion of Sipernat D11 treated silica in 1000 cSt PDMS. Mixing speed was increased to 600 rpm and held at 70° C. for 10 minutes. Cooling was then begun with mixing maintained at 600 rpm until the concentrate was at 40° C. When the product was observed by microscopy encapsulated structures were seen.

EXAMPLE 34

The process of Example 33 was repeated except that 6.67 parts of Pegosperse 50 DS and 13.33 parts of the silica/PDMS mixture were used. The amount of sunflower oil was kept at 80 parts.

EXAMPLE 35

3 parts of the antifoam concentrate of Example 34 were diluted with 7 parts of the polar organic liquid described in Examples 27 to 29. The resulting antifoam was tested in the sparge test unit using potato liquor at 25° C. At 5 minutes the foam column was 23 cm (cf 42.5 cm using the diluent alone) and at 15 minutes the foam column was 44 cm (cf 85 cm after 12 minutes for the diluent alone).

EXAMPLE 36

0.375 parts of Aldo MS, 8.00 parts of a blend of 95 parts of a 33% dispersion. of a resinous silicone in 1000 cSt PDMS and 5 parts of a treated silica (Sipernat D11), and 12.22 parts of sunflower oil were mixed at 300 rpm until evenly dispersed. Then the mixture was heated to 65° C. and mixed for 15 minutes at 300 rpm, followed by a similar mixing time and rate at 85° C. Finally the mixing rate was increased to 450 rpm and heating at 85° C. maintained for 30 minutes. 72.8 parts of Pluronic L121 and an additional 6.58 parts of sunflower oil was then added with mixing at 300 rpm for 15 minutes. Cooling was then begun with mixing maintained at 600 rpm to form a concentrate comprising encapsulated antifoam.

EXAMPLE 37 to 40

Antifoam concentrates were prepared as described in Example 36 except that the amount of Aldo MS was increased to 1.50, 4.00, 7.00 and 10.00 parts respectively. In each case as the amount of Aldo MS was increased, the amount of sunflower oil was correspondingly decreased so as to keep the total formulation at 100 parts.

Each of the Antifoam Concentrates was diluted 1 part to 3 parts with n-butanol and tested in the sparge column using potato liquor at 25° C. Comparative experiments were carried out using no antifoam or using a commercial mineral oil based antifoam comprising a proprietary liquid polyol derivative and silica. Table 6 lists the results.

TABLE 6

| Parts of Surfactant in Antifoam Concentrate | Antifoam Concentrate Actives (ppm) | Foam Height (cm) | |
|---|---|---|---|
| | | At 5 minutes | At 15 minutes |
| 0.375 | 25 | 2.0 | 13.0 |
| 1.5 | 25 | 0.5 | 4.5 |
| 4.0 | 25 | 0.5 | 1.5 |
| 7.0 | 25 | 0.5 | 1.0 |
| 10.0 | 25 | 0.5 | 3.5 |
| No Antifoam | | 74.0 | >85.0 |
| Commercial Antifoam | 50 | 3.0 | 6.0 |

All compositions reduced foam in the liquor relative to a no antifoam control. Optimal performance is reached with a minimum of 1.5 parts of the surfactant, and most preferred performance is reached with 4.0–7.0 parts of the surfactant present in the antifoam formulation.

What is claimed is:

1. A silicone composition comprising a continuous phase of a polar organic liquid having dispersed therein particles of a silicone antifoam material encapsulated within an organic encapsulating material which is solid at 25° C., is sparingly soluble in the polar organic liquid at 25° C. but is substantially dissolved in the polar organic liquid at an elevated temperature in the range 40–100° C., wherein the three phase contact angle between the organic encapsulating material, the silicone antifoam, and the polar organic liquid, with the angle measured through the silicone, is below 130°.

2. The composition according to claim 1 wherein the organic encapsulating material comprises a surfactant of HLB below 8 which is crystalline and has a melting point of 40–100° C.

3. The composition according to claim 2 wherein the organic encapsulating material is a blend of 50 to 100% by weight of a crystalline surfactant of HLB below 8 and 0 to 50% of an alkylmethyl polysiloxane wax.

4. The composition according to claim 2 wherein the organic encapsulating material is a blend of 50 to 100% by weight of a crystalline surfactant of HLB below 8 and 0 to 50% of an oil or fat which is not miscible with the polar organic liquid.

5. The composition according to claim 2 wherein the surfactant of HLB below 8 is a fatty acid.

6. The composition according to claim 2 wherein the surfactant of HLB below 8 is a fatty acid ester.

7. The composition according to claim 1 wherein the organic encapsulating material is associated with a hydrophobic silicaceous material.

8. The composition according to claim 7 wherein the hydrophobic silicaceous material is a branched silicone resin containing monovalent trihydrocarbonsiloxy (M) groups of the formula R3SiO1/2 and tetrafunctional (Q) groups SiO4/2 or trivalent hydrocarbonsilsesquioxy (T) RsiO3/2 groups, wherein R denotes a monovalent hydrocarbon group.

9. The composition according to claim 7 wherein the hydrophobic silicaceous material is a silica with surface area greater than 100 m2/g that is rendered hydrophobic.

10. The composition according to claim 1 wherein the silicone active material is an antifoam comprising a polyorganosiloxane fluid and a hydrophobic filler.

11. The composition according to claim 1 wherein the polar organic liquid continuous phase comprises a polyether.

12. The composition according to claim 11 wherein the polyether is a polyoxyethylene polyoxypropylene block copolymer.

13. The composition according to claim 1 wherein the three phase contact angle between the solid organic encapsulating material, the silicone antifoam, and the continuous phase, with the angle measured through the silicone, is between 110° and 45°, when measured at 25° C. after 10 minutes of equilibration.

14. The composition of claim 1 wherein the polar organic liquid has dispersed therein a polyorganosiloxane fluid, a surfactant of HLB below 8 and a hydrophobic silicaceous material.

15. The foam control composition according to claim 14 wherein the polyorganosiloxane fluid is a linear, branched or crosslinked polydiorganosiloxane having a silanol level of from 0.01–0.05% by weight.

16. A process for controlling foam in an aqueous medium, comprising providing the composition according to claim 14 and adding it to the aqueous medium to control the foam in the aqueous medium.

17. A process for the production of an encapsulated silicone composition comprising (i) dispersing a silicone antifoam material, a solid organic encapsulating material and a hydrophobic silicaceous material in a polar organic liquid with shear so that the average silicone particle size is less than 0.5 mm., the temperature of the resulting dispersion being sufficiently high that the said organic encapsulating material is dissolved in the composition; and (ii) cooling the dispersion to deposit the organic encapsulating material onto the interface of the silicone particles while agitating sufficiently to maintain the silicone particle size below 0.5 mm.

18. The process according to claim 17 wherein the hydrophobic silicaceous material is a branched silicone resin containing monovalent trihydrocarbonsiloxy (M) groups of the formula $R_3SiO_{1/2}$ and tetrafunctional (Q) groups $SiO_{4/2}$ or trivalent hydrocarbonsilsesquioxy (T) $RsiO_{3/2}$ groups, wherein R denotes a monovalent hydrocarbon group, and is premixed with the silicone antifoam material.

19. The process according to claim 17 wherein the hydrophobic silicaceous material is a silica with surface area greater than 100 m2/g that is rendered hydrophobic and is premixed with the organic material of melting point 40–100° C.

20. The process according to claim 17 wherein during step (i) the silicone antifoam material is mixed with the polar organic liquid and the said organic encapsulating material and the mixture is heated while shearing the mixture so that the average silicone particle size is less than 0.5 mm.

21. The process according to claim 17 wherein during step (i) the said solid organic encapsulating material is dispersed in the silicone antifoam material at a temperature at least 5° C. above the melting point of the organic encapsulating material with agitation so as to produce particles of the organic encapsulating material of particle size finer than 0.5 mm and the resulting dispersion is mixed with the polar organic liquid at a temperature at least 5° C. above the melting point of the organic encapsulating material so that the organic encapsulating material substantially dissolves into the composition, while shearing the mixture so that the average silicone particle size is less than 0.5 mm.

22. The process according to claim 17 wherein the mixture is sheared to an average silicone particle size of 5–100 microns.

\* \* \* \* \*